US012448990B2

(12) United States Patent
Jaskiewicz et al.

(10) Patent No.: US 12,448,990 B2
(45) Date of Patent: Oct. 21, 2025

(54) TWO-STAGE SERVO VALVE

(71) Applicant: Goodrich Actuation Systems Limited, Wolverhampton (GB)

(72) Inventors: Zbigniew Jaskiewicz, Wroclaw (PL); Kamil Mastalerz, Wroclaw (PL)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 54 days.

(21) Appl. No.: 18/540,177

(22) Filed: Dec. 14, 2023

(65) Prior Publication Data

US 2024/0209875 A1 Jun. 27, 2024

(30) Foreign Application Priority Data

Dec. 23, 2022 (EP) .................................... 22461651

(51) Int. Cl.
*F15B 13/043* (2006.01)

(52) U.S. Cl.
CPC ................................ *F15B 13/0438* (2013.01)

(58) Field of Classification Search
CPC .................................................. F15B 13/0438
See application file for complete search history.

(56) References Cited

U.S. PATENT DOCUMENTS 2,823,689 A * 2/1958 Donald ............... F15B 13/0438 137/82
2,832,365 A * 4/1958 Smith ....................... F15B 9/17 137/82
2,866,476 A 12/1958 George
2,924,241 A * 2/1960 Bauer ................. F15B 13/0431 137/85
3,437,101 A * 4/1969 James ................. F15B 13/0436 137/83
4,513,782 A 4/1985 Contartese et al.
9,309,900 B2 4/2016 Kopp
(Continued)

FOREIGN PATENT DOCUMENTS

| | | | |
|---|---|---|---|
| DE | 3737143 | A1 | 5/1989 |
| GB | 2104249 | A | 3/1983 |
| JP | 2010117002 | A | 5/2010 |

OTHER PUBLICATIONS

Abstract of DE3737143 (A1), Published: 1989-05-11, 1 page.
(Continued)

*Primary Examiner* — Eric Keasel
(74) *Attorney, Agent, or Firm* — CANTOR COLBURN LLP

(57) ABSTRACT

A two-stage servo valve comprising a first drive stage and a second fluid transfer stage. The fluid transfer stage includes a housing having a plurality of ports and a spool axially moveable within an axial cavity defined within the housing to control flow of fluid between the plurality of ports according to the axial position of the spool, wherein the drive stage is configured to cause axial movement of the spool. The housing has three ports, a first port being a supply port fluidly connected to a second port, being a control port, via a supply channel (sc) and a first control channel (cc1) via the spool cavity, and a third port being a return port fluidly connected to the control port via a return channel (rc) and a second control channel (cc2) via the spool cavity.

12 Claims, 2 Drawing Sheets

(56) References Cited

U.S. PATENT DOCUMENTS

| | | | |
|---|---|---|---|
| 9,709,177 | B2 | 7/2017 | Futa et al. |
| 10,508,746 | B2 | 12/2019 | Cis et al. |
| 10,683,943 | B2 | 6/2020 | Kozlowski et al. |
| 11,408,443 | B2 | 8/2022 | Jaskiewicz |
| 11,415,242 | B2 | 8/2022 | Korczynski et al. |
| 2015/0047729 | A1 | 2/2015 | Kopp et al. |
| 2020/0166151 | A1 | 5/2020 | Jaskiewicz et al. |
| 2021/0270385 | A1 | 9/2021 | Jaskiewicz et al. |

OTHER PUBLICATIONS

Abstract of JP2010117002 (A), Published: 2010-05-27, 1 page.
European Search Report for Application No. 22461651.6, mailed Jul. 18, 2023, 9 pages.

* cited by examiner

TWO-STAGE SERVO VALVE

CROSS REFERENCE TO RELATED APPLICATIONS

This application claims priority to European Patent Application No. 22461651.6 filed Dec. 23, 2022, the entire contents of which is incorporated herein by reference.

TECHNICAL BACKGROUND

The present disclosure is concerned with servo valves and, in particular, two-stage servo valves.

BACKGROUND

Servo valves are mechanisms which control fluid flow to effect driving or control of another part e.g. an actuator, and find a wide range of applications for controlling oil, air, fuel or other fluid flows.

Various types of servo valves are known, examples of which are described in UK Patent Application No. GB 2104249A, U.S. Patent Application Publication No. 2015/0047729 and U.S. Pat. No. 9,309,900, all of which are incorporated herein by reference.

Generally, a servo valve transforms an input control signal into movement of a spool to vary fluid flow through the servo valve. Conventionally, servo valve systems operate by obtaining pressurised fluid from a high pressure source, e.g. via a pump. In the case of two-stage servo valves, a first stage with a motor e.g. an electrical or electromagnetic force motor or torque motor is controlling a moveable member, typically a flapper, or a jet pipe, is deflected by action of an armature connected to the motor away from or towards nozzles, which controls the fluid flow through the nozzles. The motor can operate to position the moveable member in response to an input drive signal or control current, to control flow through the first, pilot, stage which controls fluid flow to drive the second stage valve member e.g. the spool valve by controlling the flow of fluid acting on the spool. Movement of the spool causes alignment between the ports and fluid channels to be changed to define different flow paths for the control flow which, in turn, can control flow of hydraulic fluid and by creating a pressure imbalance on an element that is controlled by the servo valve e.g. an actuator, enables precise movement or force control.

Such mechanisms are used, for example, in various parts of aircraft where the management of fluid/air flow is required, such as in engine fuel control, oil flow, engine bleeding systems, anti-ice systems, air conditioning systems and cabin pressure systems, as well as landing gear systems, braking systems and primary flight control surfaces. Servo valves also are widely used to control the flow and pressure of pneumatic, fuel and hydraulic fluids to an actuator, e.g. to control moving parts such as fuel or air systems. Some examples of applications are aircraft, automotive systems and in the space industry.

Whilst such servo valves have been found to be effective in many applications, they are relatively large, bulky and heavy parts and the component parts have to be machined and assembled with high accuracy, which increases the cost and time of manufacture and assembly. In aircraft, and other fields, there are restrictions on permitted size and weight of parts and cost and efficiency is also often a limiting factor. There is, therefore, a need for a servo valve that can be manufactured and assembled more quickly and at lower cost, is smaller, simpler and lighter and enables reliable and effective operation.

SUMMARY

According to the present disclosure, there is provided a two-stage servo valve comprising a first, drive stage and a second fluid transfer stage, the fluid transfer stage comprising a housing having a plurality of ports and a spool axially moveable within an axial cavity defined within the housing to control flow of fluid between the plurality of ports according to the axial position of the spool, wherein the drive stage is configured to cause axial movement of the spool; wherein the housing comprises three ports, a first port being a supply port fluidly connected to a second port, being a control port, via a supply channel and a first control channel via the spool cavity, and a third port being a return port fluidly connected to the control port via a return channel and a second control channel via the spool cavity, and wherein the spool comprises a middle portion and first and second end portions, a first opening defined between a first edge of the middle portion and the first end portion and a second opening defined between a second edge of the middle portion and the second end portion, the first and second openings being sized such that in a neutral position, the first opening does not overlap both the supply channel and the first control channel and the first edge K1 is positioned to prevent fluid flow between the supply channel and the first control channel and the second opening does not overlap both the return channel and the second control channel and the second edge L1 is positioned to prevent fluid flow between the second control channel and the return channel; in a first axial position, the first edge K1 is positioned such that the first opening overlaps at least a portion of both the supply channel and the first control channel to allow fluid flow between the supply channel and the first control channel, and the second opening does not overlap both the return channel and the second control channel and the second edge L1 is positioned to prevent fluid flow between the second control channel and the return channel; and in a second axial position, the second edge L1 is positioned such that the second opening overlaps at least a portion of both the return channel and the second control channel to allow fluid flow between the return channel and the second control channel, and the first opening does not overlap both the supply channel and the first control channel and the first edge K1 is positioned to prevent fluid flow between the supply channel and the first control channel.

BRIEF DESCRIPTION

Embodiments will now be described, by way of example only, with reference to the Figures.

Figure 2:
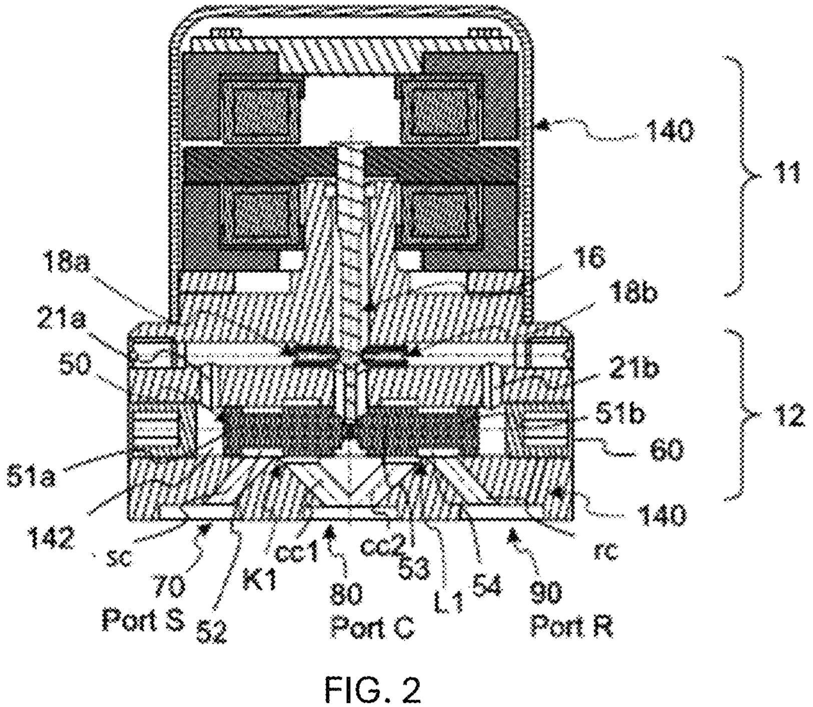
FIG. 2 is a cross-section of an example of a servo valve according to the disclosure.
Figure 4:
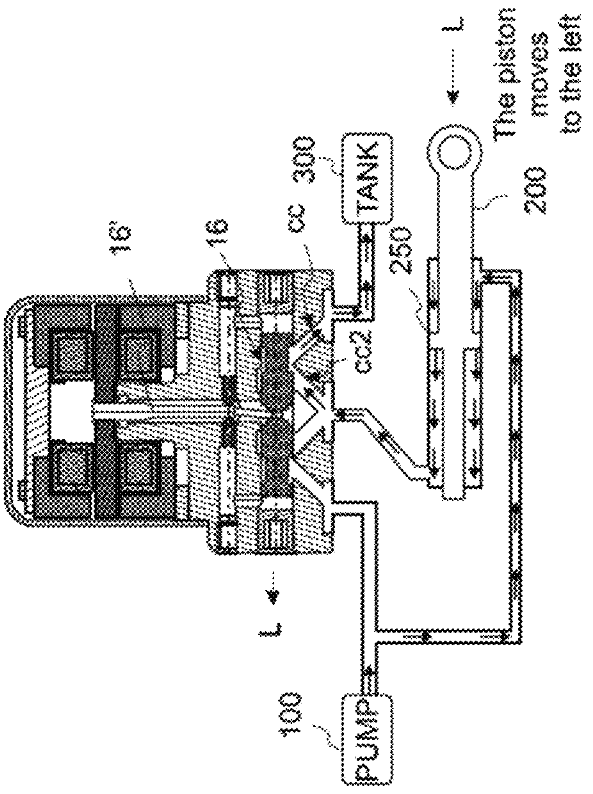

FIG. 4 also illustrates operation of a servo valve according to the disclosure such as the servo valve in FIG. 2.

DETAILED DESCRIPTION

Figure 1:
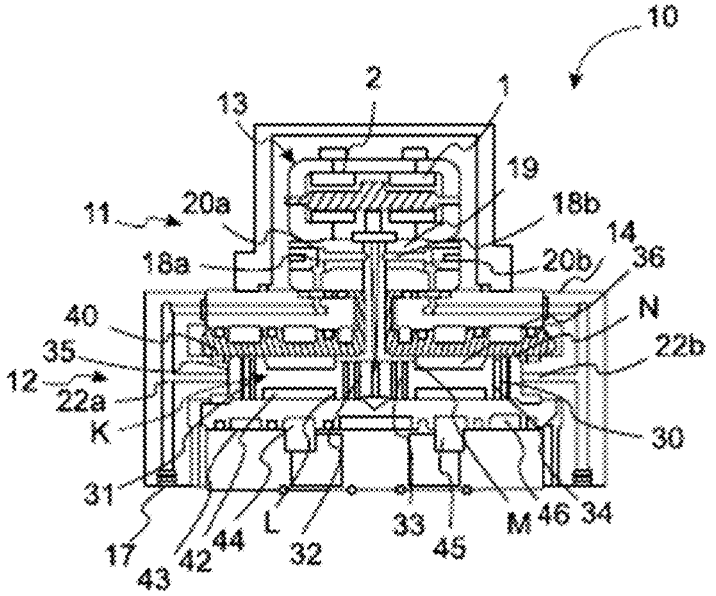
FIG. 1 is a cross-section of a known two-stage servo valve for the purposes of explanation.

With reference to FIG. 1, a known servo valve 10 is described below. The servo valve is a two-stage servo valve comprising a first stage 11 and a second stage 12 in a housing 14. The servo valve 10 comprises a drive stage such as an electric motor 13, typically a torque motor. The electric motor 13 and the second stage 12 are disposed on either side of the first stage 11. The electric motor 13 comprises permanent magnets 1, coils 2, and an armature 3. The coils are electrically connected with an electrical supply (not shown) and, when activated, create a magnetic field in the soft magnetic armature, which interacts with permanent magnets. This is just one example of a drive stage and other drive stages for driving a movable member to regulate fluid flow in the first stage may also be used.

The servo valve has a fluid flow system. This provides for the flow of a working fluid, such as a hydraulic fluid, for operating the servo valve 10. Hydraulic fluid is, for example, fuel or oil. The fluid flow system includes a fluid supply (not shown) from which fluid is provided to the servo valve via an inlet fluid port 17. The fluid supply is a common fluid supply to both the first stage 11 and the second stage 12.

The first stage 11 of the servo valve comprises a flexible moveable member 16 which, in this example, is a flapper, which is actuated by the electric motor 13. Other examples may use a jet pipe as the moveable member, through which fluid is provided. The armature of the electric motor 13 causes the flapper to be deflected. The first stage 11 comprises two axially aligned, opposed first stage nozzles 18*a*, 18*b*. The first stage nozzles are housed within a nozzle chamber 19 and comprise fluid outlets 20*a*, 20*b* which are spaced apart from each other. Working fluid is received at the first stage nozzles from the fluid supply via the inlet port 17 and via respective channels 21*a*, 21*b*. The flapper is received between the fluid outlets of the first stage nozzles. The flapper interacts with the fluid outlets of the first stage nozzles to alternately block the nozzles and provide metering of fluid from the fluid outlets, according to the axial position of the flapper as controlled by the drive stage. Blockage of each fluid outlet of the first stage nozzles causes a pressure differential between different sides of the first stage 11 of the servo valve 10 which is provided to the second stage 12 at corresponding spool end ports 22*a*, 22*b* to control operation of the second stage 12. The second stage comprises a movable spool 30 axially moveable within cavity 42 defined by a spool sleeve 40 in the housing. Spool end ports 22*a*, 22*b* are provided at each end of the cavity 42 to provide pressurized fluid to act on the ends of the spool to cause it to move axially within the sleeve, due to pressure imbalance.

In operation, fluid from the supply passes (usually through filters) through apertures in the sleeve into the cavity and also passes to the nozzles via the channels 21*a*, 21*b* and to the spool end ports 22*a*, 22*b*. If, for example and with reference to FIG. 1, the flapper is caused to pivot to the left, nozzle 18*a* will be blocked by the flapper which causes pressure to build in channel 21*a* applying pressure to the left-hand end of the spool 30 via spool end port 22*a* causing the spool to move to the right. Alternatively, if the flapper moves to the right, pressure is applied to the right-hand end of the spool causing the spool to move to the left.

The spool 30 is formed to have a number of spool portions 31, 32, 33, 34 along the axial length of the spool that define edges K, L, M, N extending across the radial extent of the cavity in which the spool moves and which define chambers 35, 36 in the cavity between the edges. As seen, in this example, the spool 30 has opposing end portions 31, 34 defining, respectively, inner edges K and N, and two inner portions 32, 33 which abut at their axially inner sides and define axially outer edges L, M. A first chamber 35 is defined between edges K and L and a second chamber 36 is defined between edges M and N. All four edges are needed to define the flow paths through the servo valve.

The sleeve 40 is provided with a number of openings 43, 44, 45, 46 which align with ports in the servo valve housing. The position of the spool portions relative to the openings determines whether fluid can flow between the ports or not. Typically, a servo valve will have four ports—a supply port for providing the fluid from the supply to the servo valve as described above, a return port via which fluid flowing through the nozzles is returned to the fluid supply, and two control or output ports to provide control fluid to the device e.g. actuator to be driven by the servo valve.

Movement of the spool 30 in the sleeve moves the spool portions and edges relative to the openings in the sleeve. If the spool is moved such that a spool portion lies over an opening, the opening is blocked by the spool and fluid cannot flow through it, from the cavity, or supply port. In an example, the spool may be moved to the right so that one control port is connected to the supply and the other control port is connected to return. Movement of the spool in the opposite direction connects the first control port to return and the other control port to the supply.

The spool, and particularly its spool portions and edges, as well as the sleeve and the position of the apertures and the four ports in the housing all have to be manufactured and assembled with great precision which is expensive and time consuming.

The servo valve according to this disclosure is a two-stage servo valve that, in principle, operates in a manner similar to that of the conventional servo valve described above, but using a simpler spool and housing design that is simpler, smaller, lighter, quicker and less expensive to manufacture and assemble.

Embodiments of the servo valve according to the disclosure will be described, by way of example only, with reference to FIGS. 2 to 4.

In the example shown, the drive stage and the first stage of the servo valve are the same as in the known design described above with reference to FIG. 1 and are represented by the same reference numerals The modifications according to the disclosure are to the housing and second stage 12 of the servo valve. Although the servo valve of the disclosure will be described in the context of a flapper type servo valve with a torque motor drive stage, it should be appreciated that other types of first stage (e.g., but not only, jet pipe type or jet deflector type servo valves) and other types of drive stage may be used.

The second stage of the servo valve according to this disclosure has a simplified housing having only three ports rather than the four ports of the known designs, since the control port is fluidly connected to a single chamber, rather than having two control ports connected to two chambers. Further, the servo valve has a simplified spool having only two control edges K', L' that need to be positioned to control fluid flow through the valve, rather than four, as in the known designs. The simplified design is based on the premise that many applications for servo valves do not actually require all four of the ports of the standard designs.

The housing 140 houses the first 11 and second 12 stages of the servo-valve. The first stage is conventional and will not be described further.

The second stage includes a spool 50 mounted within the housing (similar to the known design) for axial movement within a cavity 142 defined by the housing 140. In the example shown, opposing axial ends of the cavity 142 are sealed by respective plugs 60. The spool 50 defines first and second openings 52, 54 that move axially with respect to three axially spaced ports in the housing, namely a supply port 70, a control port 80 and a return port 90. The first and second openings 52, 54 are defined between a respective edge K1, L1 of a central portion 53 of the spool and respective spool ends 51*a*, 51*b*, edges K1, L1 defining control edges as described below.

Figure 3:
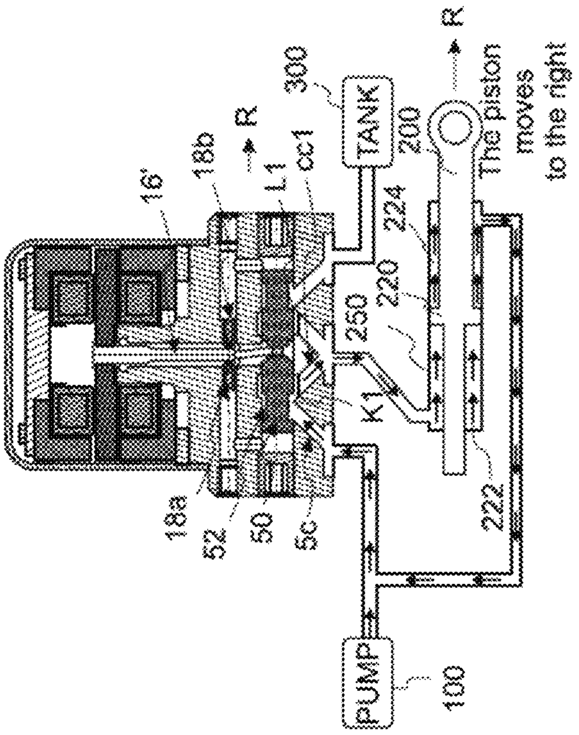
FIG. 3 illustrates operation of a servo valve according to the disclosure such as the servo valve in FIG. 2.

The three ports formed in the housing are fluidly connected to each other via the first and second openings 52, 54, via flow channels sc, cc1, cc2 and rc, as seen in FIGS. 2 to 4. The supply port 70 and the control port 80 are connected via a supply channel sc from the supply port to the spool cavity and a first control channel cc1 from the spool cavity to the control port 80. The supply channel sc and the first control channel cc1 meet at the spool cavity in the region of the first opening 52. The control port 80 and the return port 90 are connected via a second control channel cc2 from the control port to the spool cavity and a return channel rc from the spool cavity to the return port. The second control channel and the return channel meet in the region of the second opening 54. As the spool moves in response to the command from the motor, the edges K1, L1 move relative to the channels sc, cc1, cc2, rc thus controlling the overlap of the openings 52, 54 with the channels to control fluid flow between the ports 70, 80, 90. The openings 52, 54 are sized such that when the spool is in the neutral position (FIG. 2), the edge K1 is positioned so that the first opening 52 does not overlap both of the supply channel and the first control channel and so flow of fluid between the supply port and the control port is prevented. In other words, the edge K1 cuts off flow into the first control channel cc1. Similarly, the second opening 54 is sized such that, in the neutral position, the edge L1 prevents flow between the return channel rc and the second control channel cc2. To control flow to and from the connected device e.g. an actuator, the spool needs to move axially relative to the fluid channels sc, cc1, cc2, rc as described further below with reference to FIGS. 3 and 4.

In a manner similar to that described above in relation to FIG. 1, fluid is provided via the supply port 70 into the spool cavity and also flows to the nozzles 18'*a*, 18'*b* via channels 21'*a*, 21'*b*. If the drive stage moves the flapper 16' to the left, this blocks nozzle 18'*a* causing pressure to increase in channel 21'*a* which acts on the first end 51*a* of the spool to push the spool to the right, in the cavity. Conversely, if the flapper (or, of course, any other drive element, depending on the design of the first stage) is moved to the right, pressure acting on the right end 51*b* of the spool is higher and the spool is pushed to the left. According to the position of the spool, openings in the spool are aligned with different ones of the ports 70, 80, 90 for fluid flow between the ports.

FIG. 2 shows the spool in the neutral position. The first control edge K1 of the spool 50 closes the flow path between the supply port 70 and the control port 80 and the other edge L1 closes the flow path between the control port 80 and the return port 90, as described above. There is, therefore, no fluid flow from the supply (here pump) to the actuator and no flow from the actuator to the return (tank).

FIG. 3 shows the state of the servo valve when the flapper is moved to the left such that nozzle 18'*a* is closed and the pressure acting on end 51*a* of the spool is increased due to the build up of pressure in channel 21'*a*. The spool 50 is then caused to move to the right (direction R). In that position, the opening 52 defined by edge K1 aligns with, i.e. overlaps at least part of both the supply port 70 and the control port 80, with the edge K1 being positioned to the right of where the channels sc, cc1 meet. This enables fluid to flow from the supply port 70 (here receiving supply fluid from a pump 100) via the supply channel sc and the first opening 52, into the first control channel cc1 and out through the control port 80. The spool blocks flow between the supply port and the return port 90, because the second opening 54 does not overlap both the second control channel and the return channel.

In this example, the control port 80 is fluidly connected to control movement of an actuator e.g. a piston 200 mounted in a cylinder 250. The piston head 220 extends radially across the cylinder to divide the cylinder into two chambers 222, 224. The first chamber 222 is fluidly connected to the control port 80 of the servo valve and the second chamber 224 is fluid connected to the fluid supply (here a pump 100).

When the servo valve is positioned as in FIG. 3 to fluidly connect the supply and the control port, pressurized fluid flows from the control port into the first chamber 222 as shown by the arrows in FIG. 3. Although the fluid pressure in both chambers 222 and 224 is equal, the surface area of the piston head 220 is greater on the side of the first chamber as so the force of the fluid on that side is greater than on the other side, causing the piston to move to the right (R).

When, as shown in FIG. 4, the flapper is moved to the right, thus causing the spool to move to the left (L). The edges K1, L1 are positioned such that the fluid flow between the supply port and the control port is blocked but a fluid flow path is opened between the control port 80 and the return port 90 via return channel rc, second opening 54 and second control channel cc2. In this situation, fluid from the supply 100 continues to be provided to the second chamber 224 but not to the first chamber 222. The pressure in the second chamber 224 is therefore greater than that in the first chamber and pushes the piston towards the left (L). The piston head 220 then forces the fluid that is in the first chamber out through the control port, through the servo valve and out from the return port 90 into e.g. a tank 300, as shown by the arrows in FIG. 4.

By having a simplified spool and housing, where the spool only has two control edges and the housing only has three ports, the servo valve of the disclosure is much smaller, lighter and less expensive and time consuming to manufacture. As the precise machining of the spool gives rise to a large part of the manufacturing costs of a spool valve, simplifying this design provides considerable cost savings.

Further, by having a smaller spool, which provides less resistance to movement (due to a smaller contact area between the spool and the sleeve) the servo valve of the present disclosure has improved dynamic behavior A smaller hydrodynamic force is generated when fluid flows through the new spool. The servo valve can, therefore, respond more quickly to the command signals.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A two-stage servo valve comprising:

a first drive stage; and a second fluid transfer stage, the fluid transfer stage comprising:

a housing that defines an axial cavity within the housing and the housing having a plurality of ports; and a spool axially moveable within the axial cavity defined within the housing to control flow of fluid between the plurality of ports according to the axial position of the spool, wherein the first drive stage is configured to cause axial movement of the spool;

wherein the housing comprises three ports, a first port being a supply port fluidly connected to a second port, being a control port, via a supply channel (sc) and a first control channel (cc1) via the spool cavity, and a third port being a return port fluidly connected to the control port via a return channel (rc) and a second control channel (cc2) via the spool cavity, and wherein the spool comprises a middle portion and first and second end portions, a first opening defined between a first edge (K1) of the middle portion and the first end portion and a second opening defined between a second edge (L1) of the middle portion and the second end portion, the first and second openings being sized such that in a neutral position, the first opening does not overlap both the supply channel and the first control channel and the first edge K1 is positioned to prevent fluid flow between the supply channel and the first control channel and the second opening does not overlap both the return channel and the second control channel and the second edge L1 is positioned to prevent fluid flow between the second control channel and the return channel;

in a first axial position, the first edge K1 is positioned such that the first opening overlaps at least a portion of both the supply channel and the first control channel to allow fluid flow between the supply channel and the first control channel, and the second opening does not overlap both the return channel and the second control channel and the second edge L1 is positioned to prevent fluid flow between the second control channel and the return channel; and in a second axial position, the second edge L1 is positioned such that the second opening overlaps at least a portion of both the return channel and the second control channel to allow fluid flow between the return channel and the second control channel, and the first opening does not overlap both the supply channel and the first control channel and the first edge K1 is positioned to prevent fluid flow between the supply channel and the first control channel.

2. The two-stage servo valve of claim 1, wherein the drive stage includes a flapper caused to move by a motor, movement of the flapper resulting in a change in balance of pressure at first and second ends of the spool to cause axial movement of the spool.

3. The two-stage servo valve of claim 1, wherein the drive stage includes a jet pipe caused to move by a motor, movement of the jet pipe resulting in a change in balance of pressure at first and second ends of the spool to cause axial movement of the spool.

4. The two-stage servo valve of claim 1, wherein the drive stage includes an electric motor, an electromagnetic motor or a torque motor.

5. A servo valve actuator assembly comprising:

a two-stage servo valve as claimed in claim 1; and a fluid supply providing hydraulic fluid to the supply port.

6. The servo valve assembly as claimed in claim 5, wherein the fluid supply includes a pump.

7. The servo valve assembly as claimed in claim 5, further comprising:

a tank to receive fluid from the return port.

8. The servo valve assembly as claimed in claim 5, further comprising:

an actuator in fluid communication with the control port.

9. The servo valve assembly as claimed in claim 8, wherein the actuator includes a piston located in and axially moveable within a housing cylinder.

10. The servo valve assembly of claim 9, wherein the housing cylinder is in fluid communication with the control port.

11. The servo valve assembly of claim 8, wherein flow of fluid from the control port causes axial movement of the piston relative to the housing cylinder.

12. The servo valve assembly of claim 8, wherein the actuator is also in fluid communication with the fluid supply.

* * * * *